United States Patent
Chen

(10) Patent No.: US 11,166,125 B2
(45) Date of Patent: Nov. 2, 2021

(54) TRACKING DEVICE, SYSTEM FOR TRACKING OBJECTS, AND ASSOCIATED METHOD OF USE

(71) Applicant: Intelligent Cleaning Equipment Holdings Co. Ltd., Tortola (VG)

(72) Inventor: Nai Pong Simon Chen, Shanghai (CN)

(73) Assignee: INTELLIGENT CLEANING EQUIPMENT HOLDINGS CO. LTD., Tortola (VG)

(*) Notice: Subject to any disclaimer, the term of this patent is extended or adjusted under 35 U.S.C. 154(b) by 0 days.

(21) Appl. No.: 16/894,998

(22) Filed: Jun. 8, 2020

(65) Prior Publication Data

US 2020/0304957 A1    Sep. 24, 2020

Related U.S. Application Data

(63) Continuation of application No. 16/435,945, filed on Jun. 10, 2019, now Pat. No. 10,701,522, which is a continuation of application No. 16/280,413, filed on Feb. 20, 2019, now Pat. No. 10,560,811.

(60) Provisional application No. 62/632,646, filed on Feb. 20, 2018.

(51) Int. Cl.
| | |
|---|---|
| *H04W 24/00* | (2009.01) |
| *G06F 11/00* | (2006.01) |
| *H04W 4/029* | (2018.01) |
| *H04W 4/33* | (2018.01) |
| *G01C 22/00* | (2006.01) |

(52) U.S. Cl.
CPC .......... *H04W 4/029* (2018.02); *G01C 22/006* (2013.01); *H04W 4/33* (2018.02)

(58) Field of Classification Search
CPC ...... H04W 4/029; H04W 4/33; G01C 22/006; C01C 22/006
USPC ....................................... 455/456.1
See application file for complete search history.

(56) References Cited

U.S. PATENT DOCUMENTS

| | | |
|---|---|---|
| 5,206,897 A | 4/1993 | Goudreau et al. |
| 5,828,306 A | 10/1998 | Curran |
| 5,892,454 A | 4/1999 | Schipper et al. |
| 5,905,461 A | 5/1999 | Neher |
| 5,990,506 A | 11/1999 | Fossum et al. |
| 6,014,080 A | 1/2000 | Layson, Jr. |
| 6,127,668 A | 10/2000 | Baek |
| 6,127,931 A | 10/2000 | Mohr |

(Continued)

FOREIGN PATENT DOCUMENTS

| | | |
|---|---|---|
| AU | 2017101287 A4 | 11/2017 |
| WO | WO-2019164898 A1 | 8/2019 |

OTHER PUBLICATIONS

Roger Christ, "Application and Performance of Personnel Tracking Systems" Sep. 1996, IEEE.*

(Continued)

*Primary Examiner* — Mark G. Pannell
(74) *Attorney, Agent, or Firm* — Wilson Sonsini Goodrich & Rosati

(57) ABSTRACT

A tracking device including a housing, wherein the housing includes a cavity, and further wherein the housing is adapted for association with a user; an optional securement member, wherein the optional securement member is associated with at least a portion of the housing; a tracking assembly that tracks a motion logic and defines a job function of an employee/janitor.

20 Claims, 7 Drawing Sheets

(56) References Cited

U.S. PATENT DOCUMENTS

| | | |
|---|---|---|
| 6,235,549 B1 | 5/2001 | Bawolek et al. |
| 6,359,323 B1 | 3/2002 | Eom et al. |
| 6,362,778 B2 | 3/2002 | Neher |
| 6,369,417 B1 | 4/2002 | Lee |
| 6,379,992 B2 | 4/2002 | Jo |
| 6,388,612 B1 | 5/2002 | Neher |
| 6,486,913 B1 | 11/2002 | Afghahi et al. |
| 6,529,131 B2 | 3/2003 | Wentworth |
| 6,765,276 B2 | 7/2004 | Fasen et al. |
| 6,872,584 B2 | 3/2005 | Nakashiba |
| 6,972,684 B2 | 12/2005 | Copley |
| 7,129,979 B1 | 10/2006 | Lee |
| 9,881,276 B2 | 1/2018 | Cohn |
| 9,881,277 B2 | 1/2018 | Brady |
| 10,560,811 B2 | 2/2020 | Chen |
| 10,701,522 B2 | 6/2020 | Chen |
| 2004/0147059 A1 | 7/2004 | Jeong et al. |
| 2005/0065662 A1 | 3/2005 | Reindle et al. |
| 2005/0090035 A1 | 4/2005 | Kim |
| 2005/0143096 A1 | 6/2005 | Boesch |
| 2005/0234595 A1* | 10/2005 | Tani ............ A47L 9/2857 700/245 |
| 2005/0263839 A1 | 12/2005 | Suzuki |
| 2006/0011813 A1 | 1/2006 | Park et al. |
| 2006/0043261 A1 | 3/2006 | Matsuda et al. |
| 2006/0138500 A1 | 6/2006 | Kim |
| 2006/0157761 A1 | 7/2006 | Park et al. |
| 2006/0261342 A1 | 11/2006 | Wells |
| 2007/0021944 A1 | 1/2007 | Levy |
| 2007/0023802 A1 | 2/2007 | Oh et al. |
| 2007/0090274 A1 | 4/2007 | Lee et al. |
| 2007/0187793 A1 | 8/2007 | Moon et al. |
| 2008/0109470 A1* | 5/2008 | McGee ............ H04L 41/12 |
| 2009/0278694 A1 | 11/2009 | Fogg |
| 2014/0022074 A1 | 1/2014 | Balinski et al. |
| 2014/0195011 A1 | 7/2014 | Sakuta et al. |
| 2016/0139067 A1 | 5/2016 | Grace |
| 2017/0039423 A1* | 2/2017 | Cork ............ G02B 27/0172 |
| 2018/0160223 A1 | 6/2018 | Jones et al. |
| 2018/0160269 A1* | 6/2018 | Baarman ........... H04W 4/023 |

OTHER PUBLICATIONS

Roger Christ et al., "Radio Frequency-Based Personnel Location Systems" Aug. 2000, IEEE.*
EP19757547.5 EP Search Report dated Sep. 14, 2020.
U.S. Appl. No. 16/280,413 Notice of Allowance dated Sep. 24, 2019.
U.S. Appl. No. 16/280,413 Office Action dated Aug. 6, 2019.
U.S. Appl. No. 16/435,945 Notice of Allowance dated Apr. 10, 2020.
U.S. Appl. No. 16/435,945 Office Action dated Feb. 3, 2020.
U.S. Appl. No. 16/435,945 Office Action dated Sep. 27, 2019.
PCT Written Opinion of the International Searching Authority for International Application No. PCT/US19/018707 dated May 16, 2019.

* cited by examiner

TRACKING DEVICE, SYSTEM FOR TRACKING OBJECTS, AND ASSOCIATED METHOD OF USE

CROSS-REFERENCE TO RELATED APPLICATIONS

This application is a continuation of U.S. application Ser. No. 16/435,945 entitled "Tracking Device, System For Tracking Objects, And Associated Method Of Use," filed Jun. 10, 2019, which is a continuation of U.S. application Ser. No. 16/280,413 entitled "Tracking Device, System For Tracking Objects, And Associated Method Of Use," filed Feb. 20, 2019, which claims the benefit of U.S. Provisional Application Ser. No. 62/632,646, filed Feb. 20, 2018, entitled "Tracking Device, System For Tracking Objects, And Associated Method Of Use," which are hereby incorporated herein by reference in their entirety—including all references and appendices cited therein.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to tracking devices, and, more particularly, to portable tracking devices (e.g., wristbands, watches, etcetera) which track the activities of objects (e.g., personnel, employees, contractors, janitors, equipment, etcetera) via, radio frequency (e.g., extremely low frequency (3-30 Hz) to tremendously high frequency (300-3,000 GHz)) for validation and/or maximization of efficiency and/or accountability. The present invention further relates to systems for tracking objects, such as personnel/equipment, and associated methods of using these devices and systems.

By way of example, customers of contract cleaning companies, are not able to easily verify whether or not the personnel they have hired are doing their job properly (e.g., cleaning all designated and/or predetermined areas) and/or spending sufficient time on the task they have been hired to complete. This is especially problematic because most contract cleaning occurs off-shift and/or when the business established is closed and/or unmonitored. The tracking devices and systems of the present invention enable one to remotely monitor and report, for example, how much time a janitor spends on his/her tasks per hour, day, week, month and even years. The tracking devices and systems of the present invention further enable one to remotely ascertain whether a specific job or task has been completed properly.

2. Background Art

Tracking devices and tracking systems have been known in the art for years, and are the subject of a plurality of patents including, for example: U.S. Pat. No. 9,881,277 entitled "Wrist Band Haptic Feedback System," U.S. Pat. No. 9,881,276 entitled "Ultrasonic Bracelet and Receiver for Detecting Position in 2D Plane," U.S. Pat. No. 6,972,684 entitled "Personal Tracking Device," U.S. Pat. No. 6,529,131 entitled "Electronic Tether," U.S. Pat. No. 6,388,612 entitled "Global Cellular Position Tracking Device," U.S. Pat. No. 6,362,778 entitled "Personal Location Detection System," U.S. Pat. No. 6,127,931 entitled "Device for Monitoring the Movement of a Person," U.S. Pat. No. 6,014,080 entitled "Body Worn Active and Passive Tracking Device," U.S. Pat. No. 5,905,461 entitled "Global Positioning Satellite Tracking Device," U.S. Pat. No. 5,892,454 entitled "Hybrid Monitoring of Location of a Site Confinee," U.S. Pat. No. 5,828,306 entitled "Location Detector and Monitor and Method of Using the Same," and U.S. Pat. No. 5,206,897 entitled "Home Incarceration System"—all of which are hereby incorporated herein by reference in their entirety including the references cited therein.

U.S. Pat. No. 9,881,277 appears to disclose inventory management systems and related methods which employ radio frequency based tracking of a worker's hands to monitor performance of inventory tasks. An inventory management system includes inventory bins, a user-wearable unit configured to be worn in proximity to a user's hand, fixed RF antennas configured to transmit at least one RF interrogation signal and receive at least one RF response signal, an RF transceiver operatively coupled with the fixed RF antennas, and a management module operatively coupled with the RF transceiver. The user-wearable unit includes an RF transceiver configured to transmit RF response signals in response to reception of the at least one RF interrogation signal. The management module is configured to process signals generated by the RF transceiver to track locations of the user-wearable unit and identify an inventory bin based on proximity of the user-wearable unit to the identified inventory bin to monitor performance of an inventory system task.

U.S. Pat. No. 9,881,276 appears to disclose ultrasonic tracking of a worker's hands may be used to monitor performance of assigned tasks. An inventory system includes inventory bins configured to store inventory items, an ultrasonic unit, ultrasonic transducers, and a management module. The ultrasonic unit is configured to be worn by a user in proximity to the user's hand and to periodically emit ultrasonic sound pulses. The ultrasonic transducers are arranged relative to the inventory bins and configured to receive the emitted pulses. The management module is operatively coupled with the ultrasonic transducers and configured to process signals generated by the ultrasonic transducers to identify an inventory bin based on proximity of the ultrasonic unit relative to the identified inventory bin. The management module monitors performance of an assigned task based on the identified inventory bin.

U.S. Pat. No. 6,972,684 appears to disclose a system for monitoring the location of individuals, such as parolees, which includes a wearable device worn by the individual and a portable device operatively coupled to the wearable device. The portable device is operatively coupled to a monitoring system through a wireless telephone network. The portable device transmits periodically encrypted location information as well as status information across the wireless network to the monitoring system. The monitoring system tracks the location of the individual and alerts the appropriate authorities when the individual violates a rule, such as a condition for parole. The portable device increases the time between transmissions when the individual is within a specified home location and reduces the time between transmissions when outside the specified location.

U.S. Pat. No. 6,529,131 appears to disclose an apparatus for determining distance and location of a subordinate unit relative to a master unit. There may be a plurality of subordinate units for a single master unit. Both the master and subordinate unit(s) consist of a GPS receiver, RF transceiver, power supply, electronic compass, user interface and microprocessor. The master unit periodically polls and exchanges data with the subordinate unit via an RF transmission. The master unit processes the data and displays it on a display as distance and direction to a subordinate unit. The subordinate unit also processes data and displays it on a display as distance and direction to the master unit. Additionally, the master unit compares the data to user selectable predefined parameters. If the data is not within those parameters, the master unit initiates an alarm condition at both the master and subordinate unit.

U.S. Pat. No. 6,388,612 appears to disclose a global positioning and tracking system for locating objects including a plurality of tracking devices each releasably secured to an object and a central monitoring station. Each tracking device includes a processing device for storing an identification code unique to the tracking device, determining a location of the tracking device and generating a position signal based upon the determined location, a cellular transmitter/receiver for receiving and initiating cellular transmissions. The central monitoring station receives a location request and identification code from a user and initiates a cellular transmission including the identification code to a telephone number assigned to the tracking units. Upon receipt of the cellular transmission each tracking unit compares the identification code with its stored identification code. The tracking unit with a stored identification code determined to match the received identification code generates and transmits a position signal to the central monitoring station via cellular transmission channels. The central monitoring station then relays the position signal to the user. The user is able to provide a location request to the central monitoring station by at least one of a telephone communication and an electronic message via an Internet connection. Each tracking device is also able to generate a distress signal for transmission to the central monitoring unit upon detection of an emergency situation or automatically upon breaking of the circuit of the tracking unit.

U.S. Pat. No. 6,362,778 appears to disclose a personal locator system for determining the location of a locator unit. The system includes a locator device in communication with both a central station and a GPS satellite. The locator unit includes a portable housing able to be worn about the wrist of a user. A communication system is positioned within the housing for contacting the central station and includes a transmitter and receiver. A GPS unit is also positioned within the housing for contacting the GPS system for determining a location of said locator device. Upon receipt of a location request signal by the receiver from the central station, the locator unit activates the GPS unit to contact the GPS system and receive location data therefrom. Upon receipt of the location data, the transmitter transmits the location data to the central station for analysis. A panic button is provided for transmitting an emergency signal to the central station and initiating detecting the location of the locator unit. A non-emergency call button is provided for transmitting a location request signal to the central station and in response thereto, informing a person on the contact list as to the location of the locator device. The communication system utilizes one of a POTS, cellular, PCS or internet communications network. A tamper detection sensor detects when said device is tampered with. A beacon generator generates an ultrasonic or radio frequency beacon signal for aiding a person in pinpointing a location of the device.

U.S. Pat. No. 6,127,931 appears to disclose a device for monitoring the movement of a person including a homing unit and a base unit. The homing unit includes a device for generating a homing signal and a transmitter for transmitting the homing signal at predetermined intervals. The base unit includes a receiver for receiving the homing signal, a processor for processing the homing signal to determine whether the homing unit is within a predetermined distance from the base unit and generating an alarm signal upon determining the homing unit is at a distance from the base unit greater than the predetermined distance. An alarm is provided on the base unit for alerting a user that the homing unit has moved a distance greater than the predetermined distance from the base unit upon receipt of the alarm signal from the processor. The alarm is at least one of an audible alarm, a visible alarm and a vibratory alarm. At least one of the base unit and homing unit includes a device for adjusting the predetermined distance. The processor determines a time between receipt of sequentially transmitted homing signals to determine the distance between the base unit and homing unit. The base unit further includes a display for displaying the distance between the base unit and homing unit and a direction to the homing unit from the base unit.

U.S. Pat. No. 6,014,080 appears to disclose a tamper resistant body-worn tracking device to be worn by offenders or potential victims for use in a wireless communication system receiving signals from a global positioning system (GPS). The tracking device directly communicates spacial coordinates to multiple remote sites. The tracking device is an enclosed case worn on a limb of a person. The case contains a battery, a signaling device, and a circuit board containing a field programmable gate array, a wireless data modem, a conventional GPS receiver, and a matched filtering GPS receiver.

U.S. Pat. No. 5,905,461 appears to disclose a global positioning and tracking system for locating one of a person and item of property. The global positioning and tracking system comprises at least one tracking device for connection to the one of the person and item of property including a processing device for determining a location of the tracking device and generating a position signal and a transmitter for transmitting said position signal. The position signal is transmitted to a relay station strategically positioned about a desired monitoring area. The relay station includes a device for receiving the positional signal and determining if the received position signal is a valid signal and a device for relaying the position signal upon determining the position signal is valid to a central monitoring station. The central monitoring station receives the validated positional signal from the relay station and analyzes the position signal for monitoring the position of the tracking device. The system may also include a tracking satellite for receiving the validated position signal from the relay station and re-transmitting the position signal to the central monitoring station when the central monitoring station is located outside the transmission range of the relay station.

U.S. Pat. No. 5,892,454 appears to disclose a method and apparatus for monitoring present location of a person (confinee) who is to be confined to a designated site, which site can have a diameter as small as a few meters or as large as several kilometers. The present location of the confinee is checked at selected time intervals with time periods ranging from one second to thousands of seconds, as desired. The confinee wears a location-determining (LD) unit that receives electromagnetic signals that contain information allowing determination of the present location of the LD unit, and thus of the confinee, from three or more non-collinear outdoor LD signal sources and from three or more non-collinear indoor LD signal sources. The indoor LD signal sources may be radiowave transmitters. The outdoor LD signal sources may be transmitters for a Loran, Omega, Decca, Tacan, JTIDS Relnav or PLRS or similar ground-based system, or transmitters for a satellite positioning system, such as GPS or GLONASS. The relative phases or transmission times for the signals from each indoor LD signal source are determined and provided for the LD unit. The present location or change location of the LD unit is determined and compared with the permitted site location coordinates at a sequence of selected times to determine if the confinee is present at the site at such times. The LD unit issues an alarm signal if the confinee is not on the site and has not arranged beforehand to leave the permitted site for a selected time interval. The permitted site can be redefined, for a selected time interval, to include the first permitted site, a second permitted site and a corridor extending between the first and second permitted sites for a selected time interval, after which the permitted site can be changed again to include only the first or the second permitted site or a portion thereof. This allows the confinee to temporarily leave the original permitted site to seek medical attention or to attend to other needs, or to be moved permanently to the second site. The permitted site can be redefined at any time and for any subsequent time interval. One or more exclusion sites can be designated where the confinee is not permitted to go at any time.

U.S. Pat. No. 5,828,306 appears to disclose a location detector and monitor removably attached to a person utilizing a stationary monitoring computer, a satellite, and three spaced signal dishes. The satellite sends out, in response to the monitoring computer sending out a signal, a microwave signal received by the three dishes linked by telephone line to the monitoring computer. The latter plots the location of the person by the use of cartesian coordinates from the information provided by the three dishes.

U.S. Pat. No. 5,206,897 appears to disclose an incarceree identifying circuit that is used in an incarceree monitoring system which includes an incarceree identifier worn by the incarceree at a remote location with an electrical component having a selected electrical characteristic. A comparator circuit measures the selected electrical characteristic and compares the selected electrical characteristic to a reference electrical characteristic. The comparator circuit triggers a timer if the selected electrical characteristic matches the reference electrical characteristic. The timer provides a signal to a speech circuit to disable a speaker. The tone generator is responsive to the signal and provides a verification signal via a telephone link to a central station. A verification circuit at the central location receives the verification signal and determines the presence or absence of the incarceree at the remote location.

While the above-identified patents do appear to disclose tracking devices and systems for a plurality of different applications, their configurations remain non-desirous and/or problematic inasmuch as, among other things, none of the above-identified devices and systems appear to be configured to effectively track the activities of, for example, contractors/janitors via radio frequency/beacons for validation and/or maximization of efficiency and/or accountability, as well as transmit daily, weekly, monthly, and/or annual efficiency reports via smart phone and/or desktop applications.

These and other objects of the present invention will become apparent in light of the present specification, claims, and drawings.

SUMMARY OF THE INVENTION

In one embodiment, the present invention is directed to a tracking device, comprising, consisting essentially of, and/or consisting of: (a) a housing, wherein the housing comprises a cavity, and further wherein the housing is adapted for association with a user; (b) an optional securement member, wherein the optional securement member is associated with at least a portion of the housing; (c) a tracking assembly which comprises; (1) a communication sub-assembly, wherein the communication sub-assembly is at least partially positioned within the housing, and wherein the communication sub-assembly at least one of transmits and receives a position signal; (2) an energy storage device, wherein the energy storage device is at least partially positioned within the housing, and wherein the energy storage device electrically communicates with the communication sub-assembly; (d) wherein the tracking assembly preferably tracks the motion logic and defines the job function of the employee/janitor; (e) wherein the tracking assembly preferably tracks location via radio frequency/beacon; (f) wherein the tracking assembly preferably transmits data via and/or to a smart phone; and (g) wherein the tracking assembly preferably cooperatively enables the generation of hourly, daily, weekly, monthly, and/or annual efficiency reports preferably via smart phone and/or desktop applications.

In a preferred embodiment of the present invention, the tracking device further comprises a kinetic energy charger, wherein the kinetic energy charger is at least partially positioned within the housing, and further wherein the kinetic energy charger electrically communicates with at least one of the communication sub-assembly and the energy storage device.

In another preferred embodiment of the present invention, the communication sub-assembly, at least one of transmits and receives a position signal, wherein the position signal ranges in frequency from approximately 3 Hz to approximately 3,000 GHz.

The present invention is also directed to a tracking system, comprising: (a) a beacon system distributed across an area of operation, wherein at least one cleaning device operates within the area of operation; (b) a wearable device positioned on a user of the at least one cleaning device, the wearable device being configured to receive a unique identifier from the at least one cleaning device through near-field communications; and (c) a service provider system that comprises a controller having a processor and memory, the processor executing instructions stored in memory to: (1) provision the at least one cleaning device with moving logic; (2) receive signals indicative of actual movement of the user from motion sensors on the wearable device; (3) compare the actual movement of the user with the moving logic to determine if the user is operating the at least one cleaning device in accordance with the moving logic; and (4) transmit an alert to an administrator when the actual movement of the user does not correspond with the moving logic.

The present invention is further directed to a tracking method, comprising the steps of: (a) providing a beacon system distributed across an area of operation, wherein at least one cleaning device operates within the area of operation; (b) providing a wearable device positioned on a user of the at least one cleaning device, the wearable device being configured to receive a unique identifier from the at least one cleaning device through near-field communications; and (c) providing a service provider system that comprises a controller having a processor and memory, the processor executing instructions stored in memory to enable: (1) provisioning the at least one cleaning device with moving logic; (2) receiving signals indicative of actual movement of the user from motion sensors on the wearable device; (3) comparing the actual movement of the user with the moving logic to determine if the user is operating the at least one cleaning device in accordance with the moving logic; and (4) transmitting an alert to an administrator when the actual movement of the user does not correspond with the moving logic.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be further understood that the invention is not necessarily limited to the particular embodiments illustrated herein.

The invention will now be described with reference to the drawings wherein.

DETAILED DESCRIPTION OF THE INVENTION

Figure 1:
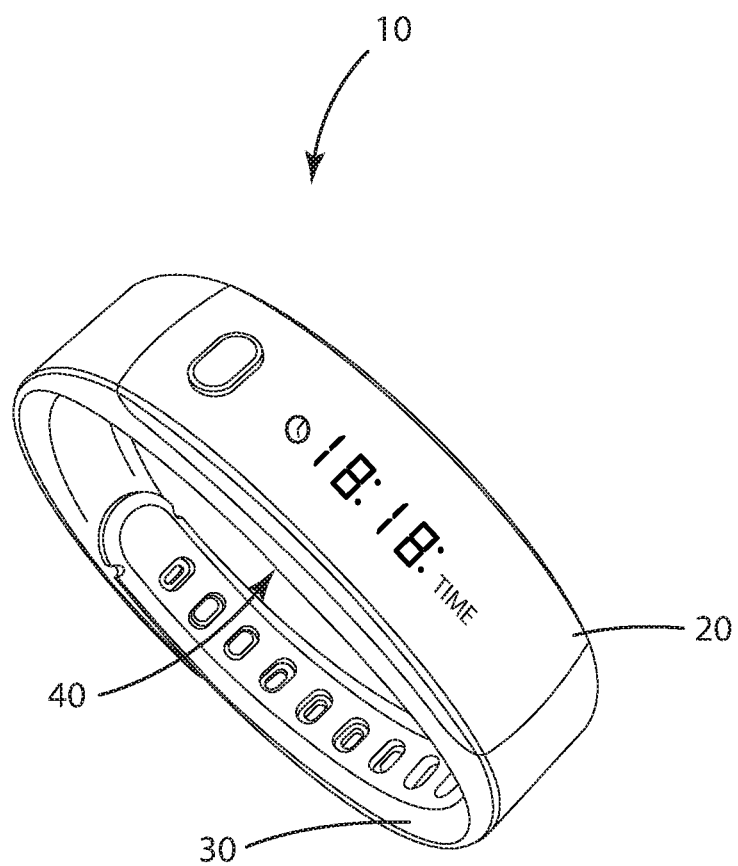
FIG. 1 is a perspective view of a tracking device fabricated in accordance with the present invention.

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of one or more embodiments of the invention, and some of the components may have been distorted from their actual scale for purposes of pictorial clarity.

Referring now to the drawings and to FIG. 1 in particular, a perspective view of tracking device 10 is shown as generally comprising housing 20, optional securement member 30, and tracking assembly 40.

In a preferred embodiment of the present invention, the tracking assembly preferably: (1) tracks the motion logic and defines the job function of an employee/janitor; (2) tracks location via radio frequency/beacon; (3) transmits data via and/or to a smart phone; and/or (4) enables the generation of hourly, daily, weekly, monthly, and/or annual efficiency reports preferably via smart phone and/or desktop applications.

Housing 20 may comprise, for example, a first wall, a second wall, a third wall and fourth wall, wherein the first and second walls are spaced apart from one another, and the third and fourth walls are spaced apart from one another to define a substantially polygonal cavity for housing, for example, tracking assembly 40—among other components. For purposes of the present disclosure, a first wall, a second wall, a third wall, a fourth wall, a cap, and a base/base member may cooperate to form a watertight housing for containing tracking assembly 40 and other components therein. It will be understood that housing 20 may comprise any one of a number of geometric configurations that are operably functional with an associated user's clothing, body, or any portion thereof (e.g., clothing pocket, belt loop, wrist, etcetera). Also, for purposes of the present disclosure, housing 20 is preferably fabricated from one or more natural and/or synthetic polymeric and/or plastic resins, metals, alloys of metals, wood, etcetera. However, any one of a number of materials that would be known to those having ordinary skill in the art with the present disclosure before them are likewise contemplated for use. Housing 20 may preferably be manufactured from a waterproof material, thereby protecting the contents of the housing from the elements, or other outside contaminates.

In one embodiment of the present invention, tracking device 10 further comprises optional securement member 30 which is shown as connected to at least a portion of housing 20. Securement member 30 may preferably be attached to housing 20 using a variety of different fasteners including, but not limited to, screws, rivets, bolts, adhesives, hook and loop arrangements—just to name a few. In one embodiment, securement member 30 may comprise a loop of elastomeric material, for example a rubber, where the elastomeric material is deflectable enough to slip over the hand of a user and will return to its original shape to secure tracking device 10 around at least a portion of the user. It will be understood that any one of a number of materials that would be known to those having ordinary skill in the art with the present disclosure before them are likewise contemplated for use.

By way of another example, optional securement member 30 may comprise a pair of straps with securement regions. The first strap preferably comprises one or more tabs, and the second strap preferably comprises one or more mating slots. Preferably, the first tab of the first strap and the first slot of the second strap are releasably secured to one another.

In an alternative embodiment of the present invention, the first tab of the first strap may comprise a series of hooks, and a first tab of the second strap comprises a series of loops. In operation, the first tab of the first strap and the first tab of the second strap cooperate to provide releasable securement of tracking device 10 to at least a portion of a user. Though this embodiment discloses hook and loop fasteners, any suitable releasable attachment means may be used, including but not limited to, a snapping type fastener, a button and loop, a zipper, a watch clasp, a buckle, an elastomeric strap—just to name a few.

In accordance with the present disclosure, tracking device 10 preferably comprises tracking assembly 40. Tracking assembly 40 is preferably at least partially positioned within housing 20. Tracking assembly 40 preferably tracks the motion logic and/or defines the job function of an object (e.g., personnel, employee, contractor, janitor, equipment, etcetera) for validation and/or maximization of efficiency and/or accountability. Tracking assembly 40 preferably tracks location via radio frequency/beacon. In one embodiment, tracking assembly 40 preferably transmits recorded and/or real time data via and/or to a smart phone. Moreover, tracking assembly 40 preferably cooperatively enables the generation of hourly, daily, weekly, monthly, and/or annual efficiency reports preferably via smart phone and/or desktop applications.

Figure 2:
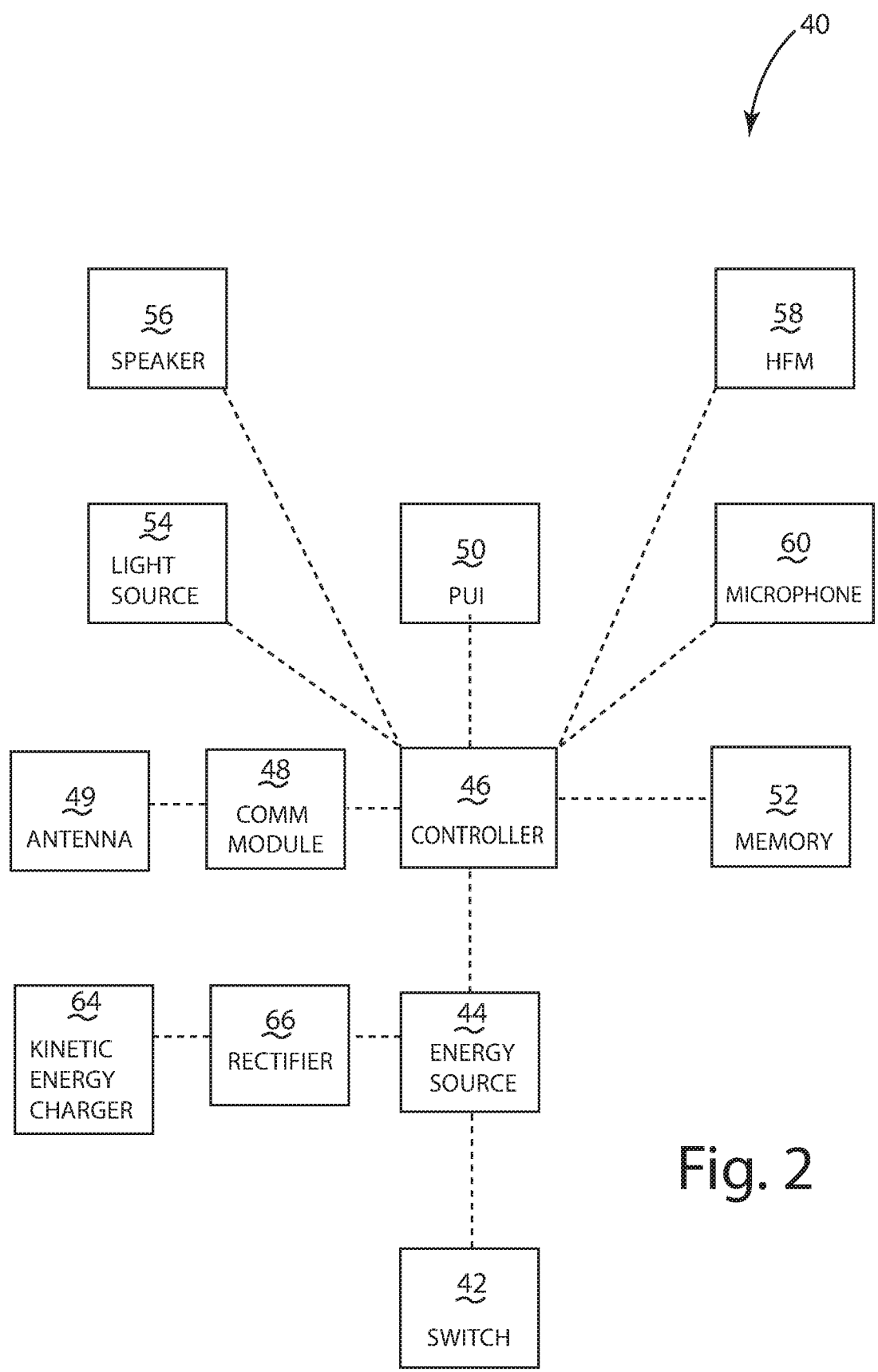
FIG. 2 is a schematic representation of the tracking device shown in FIG. 1.
Figure 3:
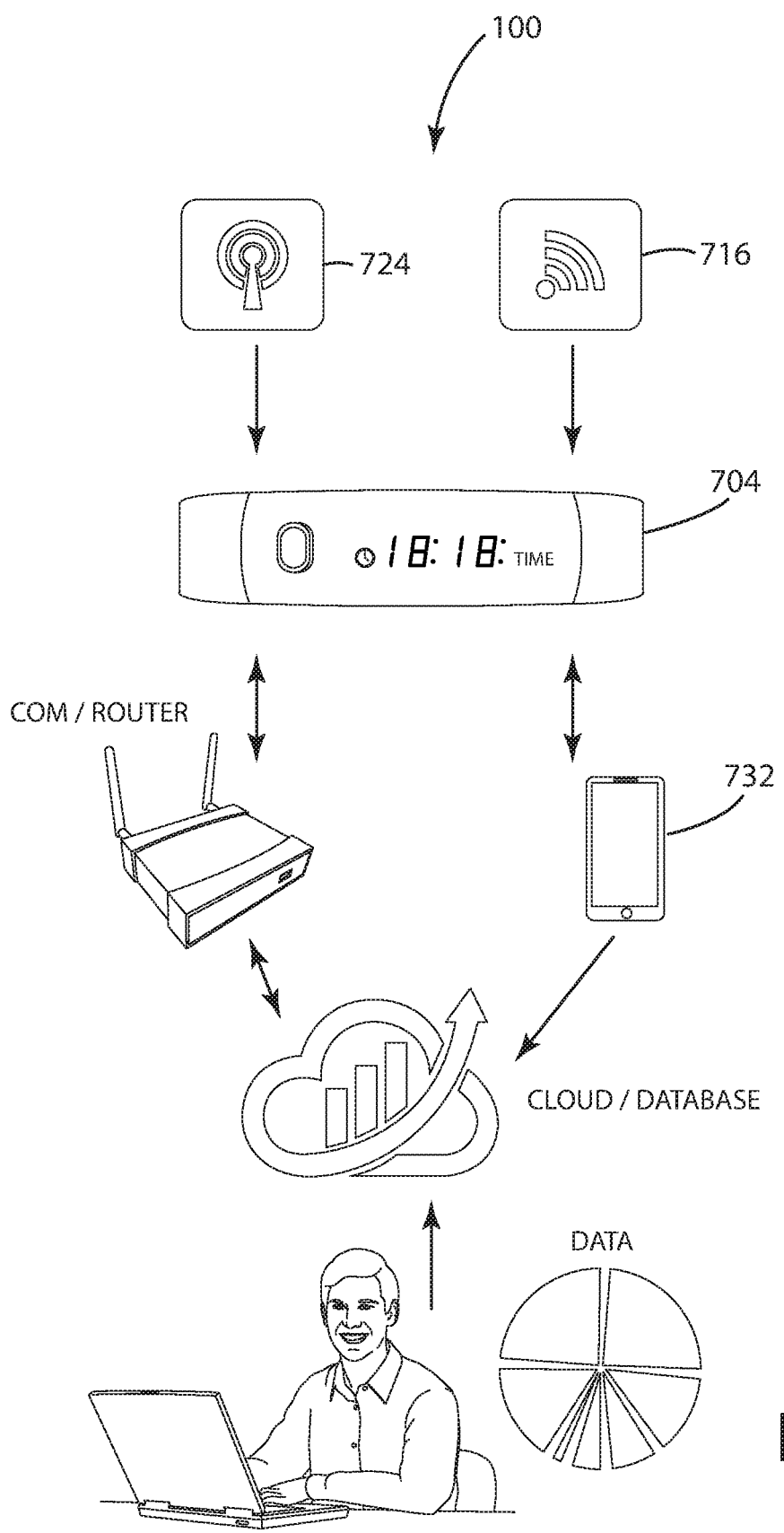
FIG. 3 is a schematic representation of a tracking system utilizing the tracking device shown in FIG. 1.

Referring now to FIG. 2, and in one embodiment of the present invention, tracking assembly 40 preferably includes and/or is associated with one or more of the following components, namely: switch 42, energy source and/or energy storage device 44, circuit board/controller (e.g., printed circuit board) 46, communication module 48, antenna 49, primary user interface 50, memory module 52, light source 54, speaker 56, haptic feedback module 58, microphone 60, kinetic energy charger 64 and rectifier 66.

Tracking assembly 40 includes one or more energy sources 44 which are preferably at least partially contained within the internal chamber or cavity of housing 20. Energy source 44 is also preferably in electrical communication with circuit board/controller 46 and on/off switch 42. Energy source 44 of tracking assembly 40 preferably comprises, a secondary electrochemical cell, such as a lead acid, NiCad, NiMH, and/or lithium-ion battery and/or fuel cell. Preferred examples of lithium-ion batteries include lithium cobalt oxide ($LiCoO_2$) batteries, lithium manganese oxide ($LiMn_2O_4$) batteries, lithium nickel manganese cobalt oxide ($LiNiMnCoO_2$) batteries, lithium iron phosphate (LiFePO) batteries, lithium nickel cobalt aluminum oxide ($LiNiCoAlO_2$) batteries, and lithium titanate ($Li_4Ti_5O_{12}$) batteries. In one embodiment, energy source 44 comprises a secondary electrochemical cell having an anode, a cathode, and an electrolyte, wherein at least one of the anode, cathode, and electrolyte are monitored by circuit board/controller 46, wherein variables pertaining to the structural integrity of the anode, the cathode, the electrolyte, a passivation layer associated with the anode and/or the cathode, and/or the cycle life of each component—including electrolyte level, are stored in memory module 52. In this embodiment, the secondary electrochemical cell participates in reversible redox reactions. In addition, energy source 44 may be coupled with at least one of a fixed capacitor, a variable capacitor, and a polarized capacitor to regulate the storage of potential energy within tracking assembly 40.

Tracking assembly 40 includes circuit board/controller (e.g., printed circuit board) 46 and is preferably at least partially contained within the internal chamber and/or cavity of housing 20. Circuit board/controller 46 is preferably in electrical communication with energy source 44. Circuit board/controller 46 is associated with and/or includes microprocessor(s), sensor(s), module(s), and/or algorithm(s) (stored internally and/or in memory module 52) for at least the following functionality, namely: unit counter, time, date, position, GPS coordinates, altimeter, barometer, temperature, job/task type identification algorithm, job/task validation algorithm, job/task completion algorithm, two-axis displacement, velocity, and/or acceleration sensor and/or algorithm, three-axis displacement, velocity, and/or acceleration sensor and/or algorithm, communications port, and/or antenna port—among other components and/or functionality.

In a preferred embodiment of the present invention, circuit board/controller 46 of electronics/tracking assembly 40 comprises one or more components, such as a battery, a bridge rectifier, a capacitor, a central processing unit, a communications port, a control board, a crystal, a diode, a fuse, a graphics board, an inductor, an input port, an integrated circuit, a microprocessor, a memory module, an oscillator, an output port a potentiometer, a receiver, a relay, a resistor, a semiconductor, a transformer, a transistor, a tuner, a video processing unit, a wired communications hub, and/or a wireless communications hub.

Tracking assembly 40 includes communication module 48 and is preferably at least partially contained within the internal chamber and/or cavity of housing 20. Communication module 48 is preferably in electrical communication with circuit board/controller 46. Communication module 48 includes a wireless communications component—preferably operating with near field communication (NFC) protocols utilizing: (1) NFC card emulation (e.g., enables NFC-enabled devices to act like smart cards); (2) NFC reader/writer (e.g., enables NFC-enabled devices to read information stored on NFC tags embedded in labels or smart posters); and (3) NFC peer-to-peer (e.g., enables two NFC-enabled devices to communicate with each other to exchange information in an ad-hoc fashion). While NFC communications have been disclosed for illustrative purposes, other radio frequency communications and protocols are likewise contemplated for use in accordance with the present invention, including, but not limited to those provided in Table I below.

TABLE I

| Frequency range | Wavelength range | ITU designation Full name | Abbreviation | IEEE bands |
|---|---|---|---|---|
| 3-30 Hz | $10^5$-$10^4$ km | Extremely low frequency | ELF | N/A |
| 30-300 Hz | $10^4$-$10^3$ km | Super low frequency | SLF | N/A |
| 300-3000 Hz | $10^3$-100 km | Ultra low frequency | ULF | N/A |
| 3-30 kHz | 100-10 km | Very low frequency | VLF | N/A |
| 30-300 kHz | 10-1 km | Low frequency | LF | N/A |
| 300 kHz-3 MHz | 1 km-100 m | Medium frequency | MF | N/A |
| 3-30 MHz | 100-10 m | High frequency | HF | HF |
| 30-300 MHz | 10-1 m | Very high frequency | VHF | VHF |
| 300 MHz-3 GHz | 1 m-10 cm | Ultra high frequency | UHF | UHF, L, S |
| 3-30 GHz | 10-1 cm | Super high frequency | SHF | S, C, X, Ku, K, Ka |
| 30-300 GHz | 1 cm-1 mm | Extremely high frequency | EHF | Ka, V, W, mm |
| 300 GHz-3 THz | 1 mm-0.1 mm | Tremendously high frequency | THF | N/A |

In one embodiment of the present invention, communication module/member 48 is preferably powered by energy storage device 44 and preferably comprises an active radio frequency identification device which transmits and/or receives a position signal. Alternatively, communication module/member 48 may comprise a global positioning system which transmits and/or receives a position signal.

In accordance with the present disclosure, communication module/member 48 preferably transmits a position signal via either a global positioning system, or an active radio frequency identification device. Examples of suitable communication configurations are provided in, for example, U.S. Pat. No. 9,881,277 entitled "Wrist Band Haptic Feedback System," U.S. Pat. No. 9,881,276 entitled "Ultrasonic Bracelet and Receiver for Detecting Position in 2D Plane," U.S. Pat. No. 6,972,684 entitled "Personal Tracking Device," U.S. Pat. No. 6,529,131 entitled "Electronic Tether," U.S. Pat. No. 6,388,612 entitled "Global Cellular Position Tracking Device," U.S. Pat. No. 6,362,778 entitled "Personal Location Detection System," U.S. Pat. No. 6,127,931 entitled "Device for Monitoring the Movement of a Person," U.S. Pat. No. 6,014,080 entitled "Body Worn Active and Passive Tracking Device," U.S. Pat. No. 5,905,461 entitled "Global Positioning Satellite Tracking Device," U.S. Pat. No. 5,892,454 entitled "Hybrid Monitoring of Location of a Site Confinee," U.S. Pat. No. 5,828,306 entitled "Location Detector and Monitor and Method of Using the Same," and U.S. Pat. No. 5,206,897 entitled "Home Incarceration System"—all of which are hereby incorporated herein by reference in their entirety including the references cited therein.

Tracking assembly 40 includes antenna 49 and is preferably at least partially contained within the internal chamber and/or cavity of housing 20. Antenna 49 may also be associated with optional securement member 30.

Primary user interface 50 is preferably associated with at least one of the sidewalls, the top wall, and the bottom wall of housing 20 of tracking device 10. Primary user interface 50 is preferably in electrical communication with circuit board/controller 46. In one embodiment of the present invention, primary user interface 50 comprises a graphical user interface and/or a circuit board having a plurality of user interface buttons. Primary user interface 50 may be associated with or form part of a display, such as an array of light-emitting diodes (LED) and/or an array of organic light-emitting diodes (OLED).

Memory module 52 is preferably positioned at least partially within housing 20 of tracking device 10. Memory module 52 is preferably in electrical communication with circuit board/controller 46. In one embodiment of the present invention, memory module 52 stores data, information, subject oriented data structures, and/or object oriented data structures obtained from at least circuit board/controller 46—among other components.

As is shown in FIG. 2, tracking assembly 40 may also include light source 54, speaker 56, haptic feedback module 58, microphone 60. The above-identified components are preferably associated directly and/or indirectly with circuit board/controller 46 and preferably positioned within housing 20 of tracking assembly 40.

Tracking assembly 40 may also be associated with or include kinetic energy charger 64 which converts the kinetic energy of an associated user/individual into an electrical current (i.e. direct current and/or alternating current). In one embodiment of the present invention, kinetic energy charger 64 is at least partially positioned within housing 20. Kinetic energy may preferably be converted from linear, torsional, vibrational and/or compressional motion of a user wearing tracking device 10. Kinetic energy charger 64 may comprise, for example, a linear kinetic energy charger, a compressional kinetic energy charger, a vibrational kinetic energy charger, or a torsional kinetic energy charger. Preferably, kinetic energy charger 64 will comprise a combination of all the aforementioned kinetic energy chargers to take advantage of all the various types of kinetic energy produced by the individual wearing tracking device 10.

In another aspect of the present invention, kinetic energy charger 64 converts the kinetic energy of a user immediately into direct current. In another embodiment of the present invention, kinetic energy charger 64, converts the kinetic energy of a user into alternating current. If kinetic energy charger 64 converts the kinetic energy to alternating current, then tracking assembly 40 may preferably further comprise rectifier 66. It will be understood that rectifier 66 is at least partially positioned within housing 20, and converts alternating current produced by kinetic energy charger 64 into direct current.

In one embodiment of the present invention, energy storage device 44 receives direct current from rectifier 66. In another embodiment, energy storage device 44 receives direct current from kinetic energy charger 64.

In another embodiment of the present invention, tracking/electronics assembly 40 further comprises one or more of a secondary energy source, a secondary light source, a secondary user interface, a secondary circuit board, a secondary speaker, a vibration mechanism, a thermal sensor, a tactile sensor, and/or a display—all of which are preferably in electrical communication with circuit board/controller 46. Preferably, the display is adapted to display at least one of alpha-numeric content, temperature, time, image and/or graphic.

In a preferred embodiment of the present invention, tracking assembly 40 further comprises an image sensor that is in electrical communication with the circuit board. The image sensor preferably provides a user with an image (e.g., a photo, a video) associated with the area proximate tracking device 10. Examples of suitable image sensors include video camera tubes, semiconductor charge-coupled devices (CCD), active pixel sensor in complementary metal-oxide-semiconductors (CMOS), N-type metal-oxide-semiconductors (NMOS, Live MOS), and back-side illuminated complementary metal-oxide-semiconductors (BSI-CMOS).

It will be understood that the above-identified image sensors are commercially available from a plurality of sources, including Agilent, Aptina, Canesta, Canon, Caeleste, CMOSIS, Dalsa, Eastman Kodak, ESS Technology, Fujifilm, MagnaChip, Matsushita, MAZeT GmbH, Mitsubishi, Nikon OmniVision Technologies, ON Semiconductor, Cypress Semiconductor, PixArt Imaging, Pixim, Samsung, Sharp, Sony, STMicroelectronics, Toshiba, TowerJazz, Town Line Technologies, TransChip, Trusight and Trusense Imaging—just to name a few suppliers.

Additional examples of suitable image sensors for use in accordance with the present invention include U.S. Pat. No. 6,359,323 B1 entitled "Color image sensor and method for fabricating the same," United States Patent Application Publication No. 2006/0043261 A1 entitled "Solid state image pickup device and image pickup system comprising it," U.S. Pat. No. 7,129,979 B1 entitled "Image sensor pixel for global electronic shuttering," United States Patent Application Publication No. 2004/0147059 A1 entitled "Method for manufacturing CMOS image sensor having microlens therein with high photosensitivity," U.S. Pat. No. 5,990,506 A entitled "Active pixel sensors with substantially planarized color filtering elements," U.S. Pat. No. 6,235,549 B1 entitled "Method and apparatus for employing a light shield to modulate pixel color responsivity," U.S. Pat. No. 6,765,276 B2 entitled "Bottom antireflection coating color filter process for fabricating solid state image sensors," U.S. Pat. No. 6,486,913 B1 entitled "Pixel array with shared reset circuitry," U. S. Pat. No. 6,872,584 B2 entitled "Solid state image sensor and method for fabricating the same," United States Patent Application Publication No. 2006/0011813 A1 entitled "Image sensor having a passivation layer exposing at least a main pixel array region and methods of fabricating the same," United States Patent Application Publication No. 2007/0187793 A1 entitled "Filter, color filter array, method of manufacturing the color filter array, and image sensor," U.S. Pat. No. 6,379,992 B2 entitled "Method for fabricating an image sensor," United States Patent Application Publication No. 2006/0138500 A1 entitled "CMOS image sensor and method for fabricating the same," United States Patent Application Publication No. 2005/0263839 A1 entitled "Photoelectric converting film stack type solid-state image pickup device, and method of producing the same," United States Patent Application Publication No. 2007/0090274 A1 entitled "Image sensors including active pixel sensor arrays," United States Patent Application Publication No. 2006/0157761 A1 entitled "Image sensor with self-boosting and methods of operating and fabricating the same," U.S. Pat. No. 6,369,417 B1 entitled "CMOS image sensor and method for fabricating the same," U.S. Pat. No. 6,127,668 A entitled "Solid state image pickup device and method for manufacturing the same," United States Patent Application Publication No. 2007/0023802 A1 entitled "CMOS image sensor and method of fabricating the same," United States Patent Application Publication No. 2005/0090035 A1 entitled "Method for fabricating CMOS image sensor protecting low temperature oxide delamination," and United States Patent Application Publication No. 2006/0261342 A1 entitled "Imaging device having a pixel cell with a transparent conductive interconnect line and the method of making the pixel cell"—all of which are hereby incorporated herein by reference in their entirety, including all references cited therein.

Figure 7:
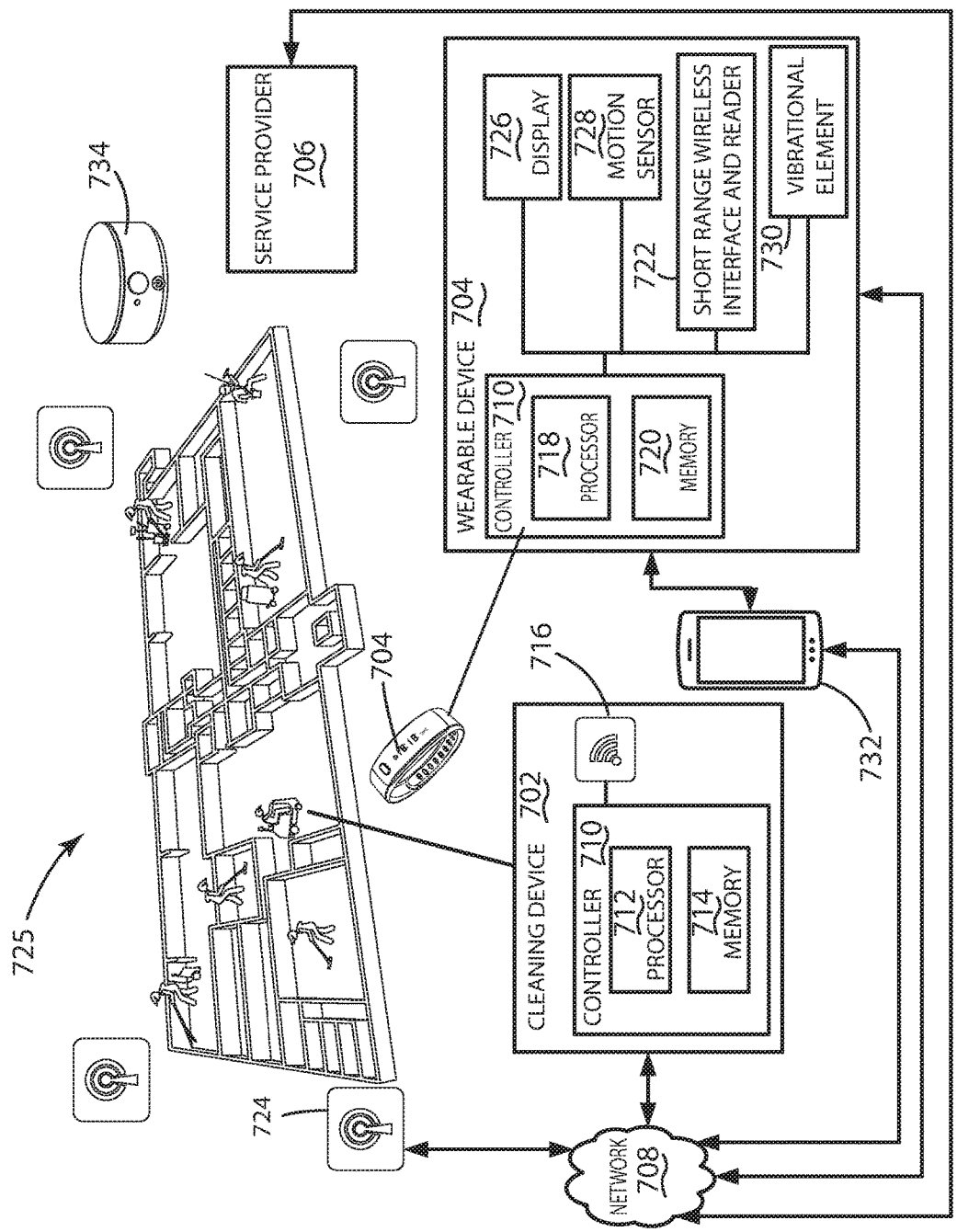
FIG. 7 is a schematic diagram of an example system architecture that can be utilized to practice aspects of the present disclosure.

FIGS. 1-6 of the present invention disclose a plurality of embodiments using tracking devices 10, tracking systems 100, and methods of use in accordance with the present invention, which are exemplary of a system shown in FIG. 7.

FIG. 7 is a schematic diagram of an example system architecture that can be utilized to practice aspects of the present disclosure. In more detail, the architecture includes cleaning device 702, wearable device 704, service provider 706, and network 708. Components of the architecture can communicate with one another as described herein over network 708. Network 708 may include any one or a combination of multiple different types of networks, such as cable networks, the Internet, wireless networks, and other private and/or public networks. In some instances, network 708 may include cellular, Wi-Fi, or Wi-Fi direct. Also, service provider 706 can be embodied as a cloud computing environment or an equivalent thereof.

Figure 4:
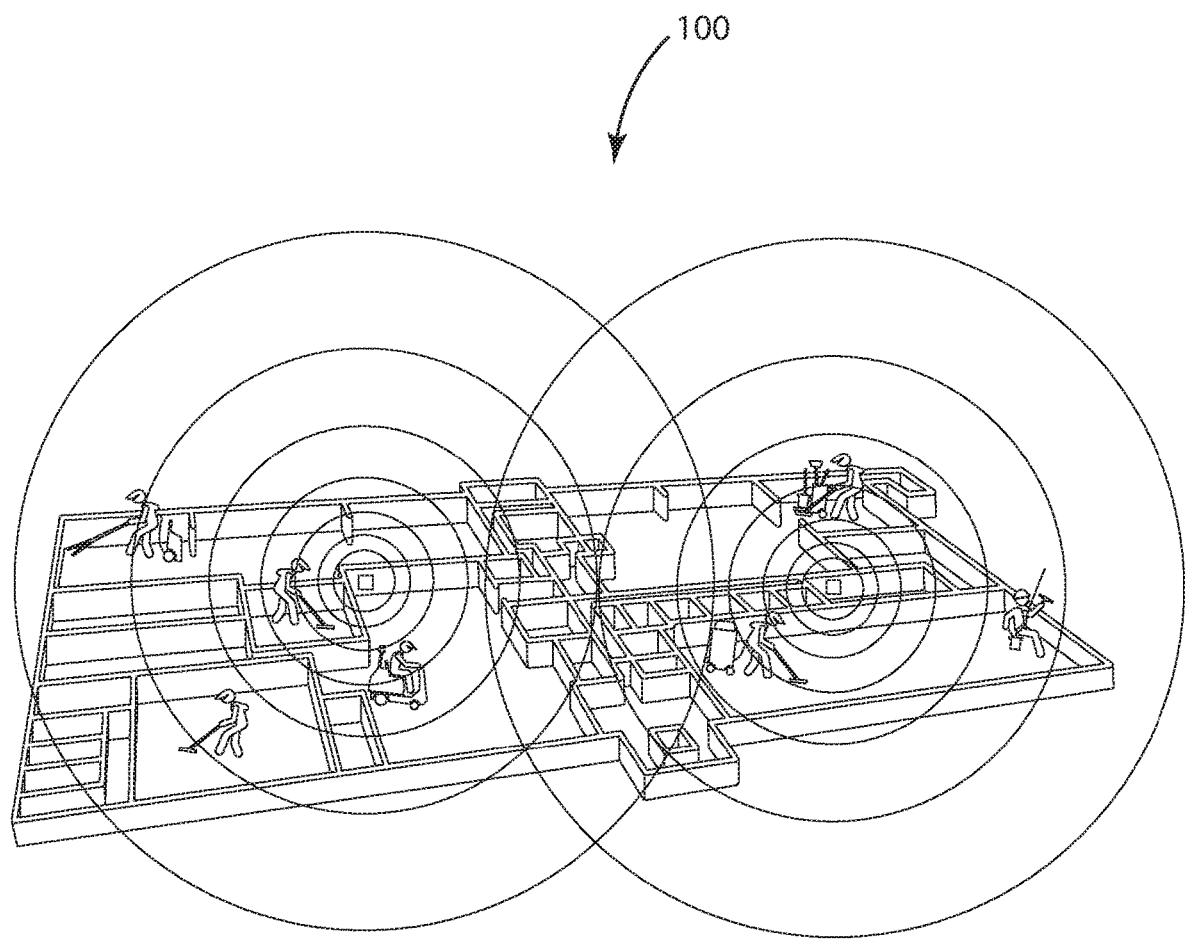
FIG. 4 is a schematic representation of a tracking system installed in a business establishment utilizing the tracking device shown in FIG. 1.

Cleaning device 702 can include any suitable cleaning apparatus (e.g., broom, mop, sweeper, floor cleaner, walk-behind floor cleaner, riding floor cleaner, polisher, power washer, window washer, etcetera) that can be operated to clean a subordinate surface, such as a mirror, a wall, a floor (see FIG. 4). In various embodiments, cleaning device 702 can comprise controller 710 that includes at least one processor 712 and memory 714 for storing executable instructions. The at least one processor 712 can execute the instructions stored in memory 714 to provide any of the functional or process features disclosed herein. In some embodiments, memory 714 also stores a unique identifier that uniquely identifies cleaning device 702. In one or more embodiments, the unique identifier is embodied in a scannable tag such as a QR code or barcode. In one embodiment, the unique identifier is embedded in NFC tag 716. In some embodiments, wearable device 704 is paired with cleaning device 702. In other embodiments, wearable device 704 and cleaning device 702 are associated or otherwise linked with one another through service provider 706.

According to some embodiments, memory 714 stores moving logic that is used to automatically navigate cleaning device 702 according to a predetermined cleaning pattern. Cleaning device 702 can receive the moving logic over network 708. In one or more embodiments, cleaning device 702 receives the moving logic over network 708 from service provider 706.

Wearable device 704, such as the wristband illustrated in FIG. 1, can include controller 710, processor 718, memory 720, and short-range wireless interface and reader 722. Processor 718 is configured to execute instructions stored in memory 720 to perform various functions such as execution of short-range wireless interface 722 to receive the unique identifier from NFC tag 716 disposed on cleaning device 702.

In some embodiments, wearable device 704 can track or impute movement of cleaning device 702 based on a location of wearable device 704 over time. It will be understood that a user of cleaning device 702 is wearing wearable device 704 while operating cleaning device 702. In some embodiments, wearable device 704 can synchronously or asynchronously transmit movement signals indicative of an actual movement of wearable device 704/cleaning device 702 to service provider 706. In some embodiments, service provider 706 is configured to compare the actual movement of wearable device 704/cleaning device 702 to the moving logic provided to cleaning device 702 by service provider 706. Stated otherwise, service provider 706 can compare the actual movement of the user with the moving logic to determine if the user is operating cleaning device 702 in accordance with the moving logic.

When the actual movement of wearable device 704/cleaning device 702 deviates from the moving logic provided to cleaning device 702, service provider 706 can reject the data provided by wearable device 704, and in some instances transmit a warning message such as an email, text, audible alarm and/or haptic feedback to the user, an administrator and/or any other supervising entity. This comparative function allows for detection of fraudulent activity by an operator of cleaning device 702. For example, if the actual movement of wearable device 704/cleaning device 702 indicates that cleaning device 702 is stationary, but the moving logic for cleaning device 702 indicates that cleaning device 702 is to be performing a cleaning operation, it can be inferred that the user of cleaning device 702 is loafing and/or acting fraudulently.

According to some embodiments, wearable device 704 can store tracking information for cleaning device 702 in memory 720 of wearable device 704 when a connection to network 708 is unavailable. In accordance with the present disclosure, the architecture can include a plurality of beacons, such as beacon 724 which are distributed around an area of operation 725 of cleaning device 702. The beacons preferably operate in an Internet-of-Things (IoT) arrangement, providing a mesh network. As wearable device 704 and/or cleaning device 702 move throughout the area of operation, wearable device 704 transmits or broadcasts its data to the nearest beacon. The beacon(s) then forward the actual movement data to service provider 706. According to some embodiments, the data provided by wearable device 704 can be transmitted in real-time or near-real-time to service provider 706. In some embodiments, wearable device 704 communicates with beacon 724 over a Bluetooth connection using short-range wireless interface 722. In some embodiments, a Bluetooth low energy (BLE) protocol is utilized.

In one or more embodiments, display 726 of wearable device 704 is configured to display tasks such as the moving logic for cleaning device 702. Other messages or communications can be transmitted to a user on display 726.

In one or more embodiments, service provider 706 can push firmware or software updates to wearable device 704 over network 708. In some embodiments, a wireless access point (access point coupled to network 708 such as a WiFi router) is positioned in the area of operation of wearable device 704 (see FIG. 3). Wearable device 704 receives the firmware or software updates from wireless access point or from beacon 724.

In one or more embodiments, wearable device 704 comprises motion sensor 728 that tracks movements of wearable device 704 from an associated user. According to some embodiments, processor 718 of wearable device 704 can implement a pedometer algorithm to filter out unnecessary movements which enables measurement of the performance of a task by the user more accurately. Processor 718 can also determine when the user began to work using the signals from motion sensor 728. Some embodiments allow for service provider 706 to perform these motion-based analyses.

Figure 5:
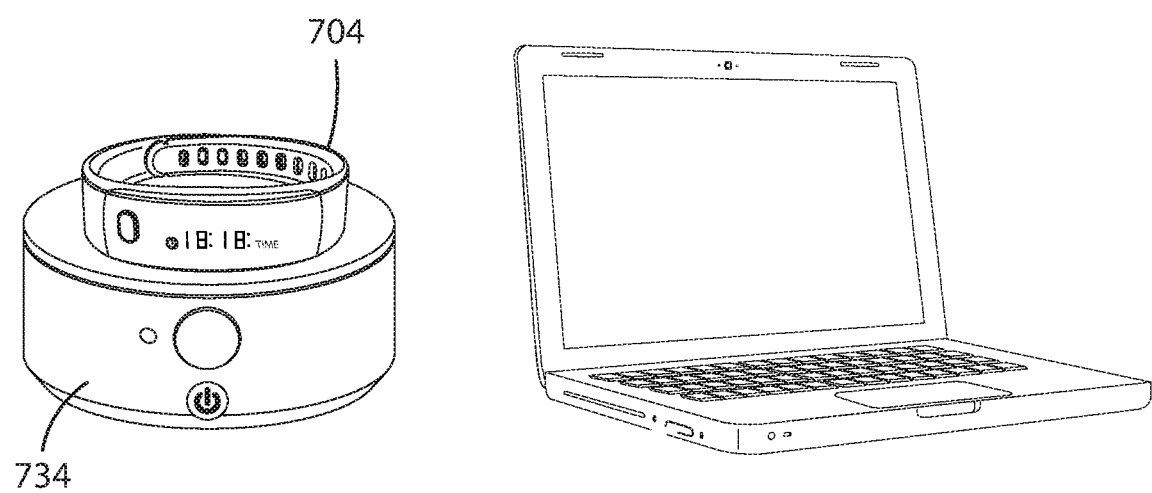
FIG. 5 is perspective view of the tracking device shown in FIG. 1 associated with a near field communication reader which is in communication with a personal computer.
Figure 6:
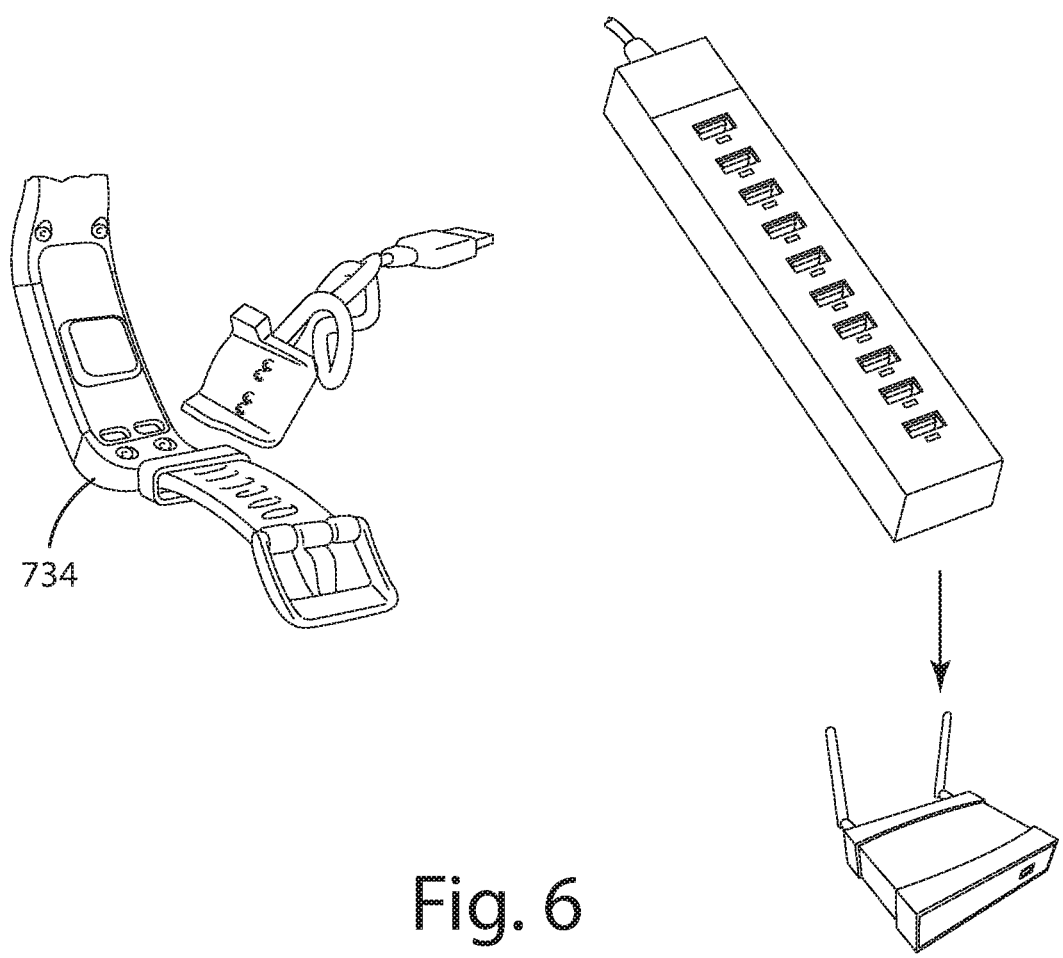
FIG. 6 is perspective view of the tracking device shown in FIG. 1 associated with a charging assembly.

According to some embodiments, wearable device 704 is configured to dock with reader device 734 (See FIG. 5). In one or more embodiments, reader device 734 can be located in the area of operation of cleaning device 702. In other embodiments, reader device 734 can be associated with cleaning device 702. Reader device 734 can be used to obtain stored data from memory 720 of wearable device 704. Reader device 734 can also be used to transfer data to wearable device 704 such as firmware and/or software data.

In one or more embodiments, in addition to transmitting messages to wearable device 704 for presentation on display 726, wearable device 704 can comprise vibrational element 730 that can cause a vibrational pattern by wearable device 704. Vibrational patterns can be used to convey the receipt of a message by wearable device 704 that is displayed on display 726. In other embodiments, a vibrational pattern provided by wearable device 704 can communicate a specific message type to the user. For example, a short set of vibrations can be used to warn the user that deviations have been determined by service provider 706. For example, service provider 706 determines that the actual movement data of cleaning device 702 deviates from the movement logic provided to cleaning device 702.

In some embodiments, wearable device 704 can couple with mobile device 732 associated with a user. Mobile device 732 can implement an application that allows mobile device 732 to communicate with service provider 706 over network 708. In some instances, mobile device 732 is used to relay data from wearable device 704 to service provider 706, such as when an access point providing connectivity through WiFi is disabled.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etcetera, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

The foregoing description merely explains and illustrates the invention and the invention is not limited thereto except insofar as the appended claims are so limited, as those skilled in the art who have the disclosure before them will be able to make modifications without departing from the scope of the invention.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

The embodiments, illustratively described herein may suitably be practiced in the absence of any element or elements, limitation or limitations, not specifically disclosed herein. Thus, for example, the terms "comprising," "including," "containing," etcetera shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etcetera. As a non-limiting example, each range discussed herein can be readily broken down into a lower third, middle third and upper third, etcetera. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed and desired to be secured by Letters Patent is:

1. A tracking device, comprising:
a housing;
a securement member configured to secure at least a portion of the housing to a user to enable the tracking device to be worn by the user;
a communication sub-assembly that provides one or more wireless communication modes for the tracking device, wherein the communication sub-assembly is at least partially positioned within the housing;
an energy storage device, wherein the energy storage device is at least partially positioned within the housing, and wherein the energy storage device electrically communicates with the communication sub-assembly; and
a processor configured to implement a pedometer algorithm to filter out one or more unnecessary movements by the user to enable more accurate measurement of a performance of a cleaning task by the user,
wherein the tracking device is configured to (i) receive a unique identifier from at least one cleaning machine and pair with the at least one cleaning machine through the one or more wireless communication modes, (ii) track a motion logic associated with the at least one cleaning machine and define a job function of the user, (iii) track a movement or a location of the user, and (iv) transmit data in real-time to a server using the one or more wireless communication modes, wherein the data comprises at least one of the tracked motion logic for the at least one cleaning machine and the tracked movement or location of the user.

2. The tracking device according to claim 1, wherein the tracking device further comprises a kinetic energy charger, wherein the kinetic energy charger is at least partially positioned within the housing, and further wherein the kinetic energy charger electrically communicates with at least one of the communication sub-assembly and the energy storage device.

3. The tracking device according to claim 1, wherein the communication sub-assembly at least one of transmits and receives a position signal, wherein the position signal ranges in frequency from approximately 3 Hz to approximately 3,000 GHz.

4. The tracking device according to claim 1, wherein the unique identifier is embodied in a scannable tag comprising a quick response (QR) code or barcode.

5. The tracking device according to claim 1, wherein the unique identifier is embedded in a near field communication (NFC) tag.

6. The tracking device according to claim 1, wherein the tracking device is configured to transmit the data to the server via one or more beacons distributed in or near an area of operation of the at least one cleaning device.

7. The tracking device according to claim 6, wherein the one or more beacons are configured to operate as a mesh network.

8. The tracking device according to claim 1, wherein the at least one cleaning machine is configured to use the motion logic to automatically navigate an area of operation according to a predetermined cleaning pattern.

9. The tracking device according to claim 1, wherein the tracking device comprises one or more motion sensors that are configured to track the location or the movement of the user.

10. The tracking device according to claim 9, wherein the one or more motion sensors comprise a velocity sensor or an acceleration sensor.

11. The tracking device according to claim 1, wherein the tracking device is configured to track the location or the movement of the user based on a position signal obtained using a global positioning unit.

12. The tracking device according to claim 1, wherein the tracking device comprises a microphone or a speaker positioned within or integrated with the housing of the tracking device.

13. The tracking device according to claim 1, wherein the tracking device is configured to provide the user with haptic feedback.

14. The tracking device according to claim 1, wherein the tracking device comprises a display for displaying an alert or a task to the user, wherein the task corresponds to the motion logic associated with the at least one cleaning machine.

15. A system comprising the tracking device and the server of claim 1, wherein the server is configured to process the data from the tracking device to generate one or more user efficiency reports.

16. The system of claim 15, wherein the server is configured to generate and transmit an alert to the user or a supervisory entity when the movement of the user deviates from the motion logic associated with the at least one cleaning machine.

17. The system of claim 16, wherein the alert comprises a message, an email, a text, an audible alarm, or haptic feedback.

18. The system of claim 15, wherein the server is configured to push one or more firmware or software updates to the tracking device via the one or more wireless communication modes.

19. The system of claim 15, wherein the server is configured to provide the motion logic to the at least one cleaning machine over a network.

20. The system of claim 15, wherein the one or more user efficiency reports comprise hourly, daily, weekly, monthly, or annual efficiency reports.

* * * * *